(12) United States Patent
Tsukamoto et al.

(10) Patent No.: US 11,251,636 B2
(45) Date of Patent: Feb. 15, 2022

(54) POWER STORAGE DEVICE AND VEHICLE COMPRISING SAME

(71) Applicant: Panasonic Intellectual Property Management Co., Ltd., Osaka (JP)

(72) Inventors: Hiroaki Tsukamoto, Aichi (JP); Yohsuke Mitani, Osaka (JP); Takahiro Kudo, Kyoto (JP); Yoshimitsu Odajima, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/920,379

(22) Filed: Jul. 2, 2020

(65) Prior Publication Data

US 2020/0335991 A1    Oct. 22, 2020

Related U.S. Application Data

(63) Continuation of application No. PCT/JP2019/002934, filed on Jan. 29, 2019.

(30) Foreign Application Priority Data

Jan. 30, 2018  (JP) ............................ JP2018-014168

(51) Int. Cl.
*H02J 7/00* (2006.01)
*B60R 16/033* (2006.01)
*H01M 10/44* (2006.01)

(52) U.S. Cl.
CPC .......... *H02J 7/0063* (2013.01); *B60R 16/033* (2013.01); *H01M 10/44* (2013.01); *H01M 2220/20* (2013.01)

(58) Field of Classification Search
CPC ..................................................... H02J 7/0063
See application file for complete search history.

(56) References Cited

U.S. PATENT DOCUMENTS 5,929,593 A * 7/1999 Eguchi ................. H02J 7/00711
320/139
2008/0150483 A1* 6/2008 Morita .................... H02J 9/061
320/122

(Continued)

FOREIGN PATENT DOCUMENTS

JP    2008-118732    5/2008
JP    2008-182872    8/2008

(Continued)

OTHER PUBLICATIONS

International Search Report of PCT application No. PCT/JP2019/002934 dated Feb. 26, 2019.

*Primary Examiner* — Daniel Kessie
(74) *Attorney, Agent, or Firm* — McDermott Will & Emery LLP

(57) ABSTRACT

A power storage device includes an input terminal, an output terminal, a first circuit, and a second circuit. The input terminal is to be electrically connected to a power supply. The output terminal is to be electrically connected to a load. The first circuit and the second circuit are electrically connected in parallel. Each of the first circuit and the second circuit are disposed between the input terminal and the output terminal. The first circuit includes a power storage unit and a discharge path that allows a discharge current from the power storage unit to flow toward the output terminal. The second circuit includes a blocking path that prevents the discharge current from flowing toward the input terminal.

9 Claims, 8 Drawing Sheets

(56) References Cited

U.S. PATENT DOCUMENTS

| | | |
|---|---|---|
| 2011/0234177 A1 | 9/2011 | Kohara et al. |
| 2015/0005976 A1 | 1/2015 | Akebono et al. |

FOREIGN PATENT DOCUMENTS

| | | |
|---|---|---|
| JP | 2011-211761 | 10/2011 |
| JP | 2015-012687 | 1/2015 |

* cited by examiner

POWER STORAGE DEVICE AND VEHICLE COMPRISING SAME

RELATED APPLICATIONS

This application is a continuation of the PCT International Application No. PCT/JP2019/002934 filed on Jan. 29, 2019, which claims the benefit of foreign priority of Japanese patent application No. 2018-014168 filed on Jan. 30, 2018, the contents all of which are incorporated herein by reference.

BACKGROUND

1. Technical Field

The present disclosure relates generally to a power storage device and a vehicle including the power storage device, and more specifically to a power storage device to be electrically connected between a power supply and a load, and a vehicle including the power storage device.

2. Description of the Related Art

Unexamined Japanese Patent Publication No. 2008-182872 discloses a power storage device to be connected between a power supply (main power supply) and a load. This power storage device includes a power storage unit for supplying electric power to the load, a first switch (power-storage-side field-effect transistor (FET) and load-side FET), and a second switch (main-power-supply-side bypass FET and load-side bypass FET). The first switch is connected between the power storage unit and the load, and the second switch is connected between the power supply and the load.

In the power storage device disclosed in Unexamined Japanese Patent Publication No. 2008-182872, first, the second switch is turned on to supply electric power of the power supply to the load. Then, if the voltage of the power supply falls below the minimum voltage for driving the load, the power storage device turns off the second switch and simultaneously turns on the first switch. As a result, electric power of the power storage unit is supplied to the load.

SUMMARY

A power storage device according to one aspect of the present disclosure includes an input terminal, an output terminal, a first circuit, and a second circuit. The input terminal is electrically connected to a power supply. The output terminal is electrically connected to a load. The first circuit and the second circuit are electrically connected in parallel. Each of the first circuit and the second circuit is disposed between the input terminal and the output terminal. The first circuit includes a power storage unit and a discharge path. The discharge path is a path that allows a discharge current from the power storage unit to flow toward the output terminal. The second circuit includes a blocking path. The blocking path prevent the discharge current from flowing toward the input terminal.

A vehicle according to one aspect of the present disclosure includes the power storage device and a vehicle body provided with the power storage device.

According to the present disclosure, it is possible to reduce the reverse flow of electric power from the power storage unit toward the power supply.

DETAILED DESCRIPTION OF EMBODIMENT

In the configuration disclosed in Unexamined Japanese Patent Publication No. 2008-182872, when the second switch for supplying electric power of the power supply to the load is turned off, the first switch for supplying electric power of the power storage unit to the load is turned on at the same time. Thus, there may be a period in which both the first switch and the second switch are in ON state, depending on individual differences in performance among elements (components) used as the first switch and the second switch. This may cause the reverse flow of electric power from the power storage unit to the power supply via the first switch and the second switch.

The present disclosure has been made in view of the above circumstances, and provides a power storage device capable of reducing the reverse flow of electric power from the power storage unit to the power supply, and a vehicle including the power storage device.

First Exemplary Embodiment (1) Overview

Figure 1:
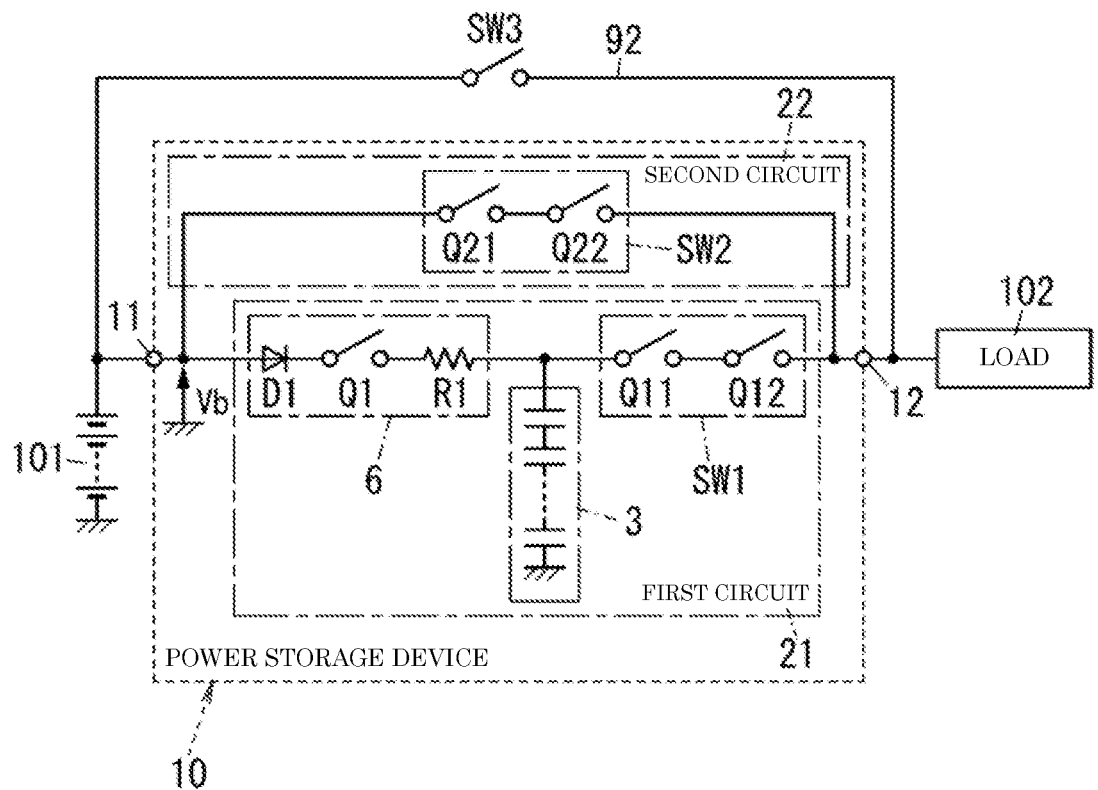
FIG. 1 is a schematic diagram illustrating a configuration of a power storage device according to a first exemplary embodiment.

As shown in FIG. 1, power storage device 10 according to the present exemplary embodiment includes input terminal 11, output terminal 12, first circuit 21, and second circuit 22. Input terminal 11 is electrically connected to power supply 101. Output terminal 12 is electrically connected to load 102. First circuit 21 and second circuit 22 are electrically connected in parallel. Each of first circuit 21 and second circuit 22 is disposed between input terminal 11 and output terminal 12. First circuit 21 includes power storage unit 3 and discharge path 210 (see FIG. 3A). Discharge path 210 is a path that allows discharge current Id1 (see FIG. 3A) from power storage unit 3 to flow toward output terminal 12. Second circuit 22 includes blocking path 220 (see FIG. 3A). Blocking path 220 prevents discharge current Id1 of power storage unit 3 from flowing toward input terminal 11.

That is, power storage device 10 according to the present exemplary embodiment is an apparatus (device) for directly supplying electric energy, which is input to input terminal 11 from power supply 101, to load 102, or for temporarily storing the electric energy in power storage unit 3 and supplying the electric energy to load 102 through output terminal 12. Since power storage device 10 is electrically connected between power supply 101 and load 102, supplying power from power supply 101 to load 102 can be controlled by second circuit 22. Further, even if a failure in supplying power or the like occurs in which, for example, the electric energy input from power supply 101 to input terminal 11 is significantly reduced, electric power can be supplied to load 102 from power storage unit 3 by first circuit 21 in power storage device 10. The "failure in supplying power" used in the present disclosure means not only a state in which electric energy input from power supply 101 to input terminal 11 is completely lost, but also a state in general in which electric energy input from power supply 101 to input terminal 11 reduces to such an extent as to impair the operation of load 102. For example, the failure in supplying power may occur when an anomaly in power supply 101 itself occurs, or when a wire between power supply 101 and input terminal 11 is broken or short-circuited.

Here, in the present exemplary embodiment, first circuit 21 includes discharge path 210 that allows discharge current Id1 from power storage unit 3 to flow toward output terminal 12. Thus, even when a failure in supplying power or the like occurs, the supply of electric power to load 102 can be covered by electric power output from power storage unit 3. Moreover, since second circuit 22 includes blocking path 220 that prevents discharge current Id1 of power storage unit 3 from flowing toward input terminal 11, the supply of electric power output from power storage unit 3 to power supply 101 can be prevented, even when power storage unit 3 is discharged. Hence, according to power storage device 10 of the present exemplary embodiment, it is possible to reduce the reverse flow of electric power from power storage unit 3 to power supply 101.

Figure 2:
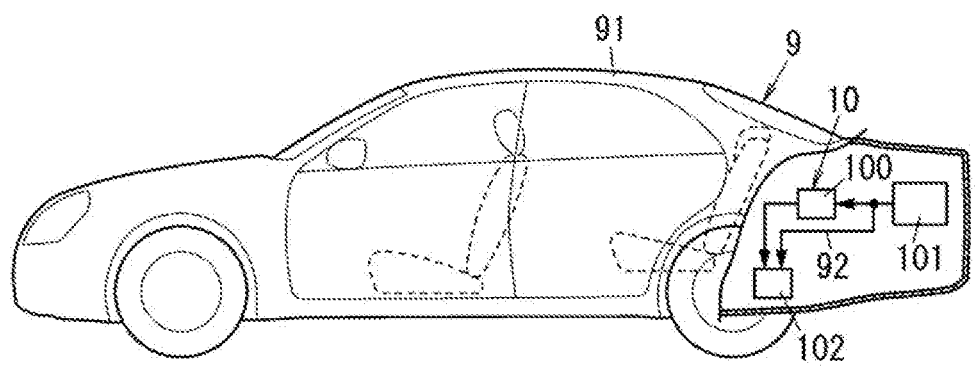
FIG. 2 is a schematic diagram illustrating a vehicle provided with the power storage device according to the first exemplary embodiment.

Meanwhile, power storage device 10 according to the present exemplary embodiment is, for example, a power storage device for a vehicle, and constitutes vehicle 9 (see FIG. 2) together with vehicle body 91 (see FIG. 2). In other words, vehicle 9 includes power storage device 10 and vehicle body 91. Vehicle body 91 is provided with power storage device 10. Vehicle body 91 is also provided with power supply 101 and load 102. In the present exemplary embodiment, vehicle 9 is, as an example, an automobile that travels on a road surface with a person on board. Vehicle 9 may be an electric vehicle, a gasoline engine vehicle, a diesel engine vehicle, a hybrid vehicle, or the like. Vehicle 9 may be an electric motorcycle (two-wheeled vehicle) or the like.

In the present exemplary embodiment, vehicle 9 includes main circuit 92 (see FIG. 1) for electrically connecting power supply 101 and load 102 using a path different from that of power storage device 10. That is, main circuit 92 is electrically connected between power supply 101 and load 102, and electric power can be supplied from power supply 101 to load 102 through main circuit 92 without power storage device 10. Hence, power storage device 10 forms a path for supplying electric power to load 102 separately from the path passing through main circuit 92, and thus achieves redundancy in supplying electric power to load 102.

In the present exemplary embodiment, first circuit 21 forms a "backup path" for supplying backup electric power to load 102 in the event of, for example, a failure of power supply 101 in which electric energy input to input terminal 11 from power supply 101 significantly decreases. On the other hand, second circuit 22 forms a "bypass path" that bypasses main circuit 92 (and first circuit 21) as a path for supplying electric power from power supply 101 to load 102.

(2) Details

Power storage device 10 according to the present exemplary embodiment and vehicle 9 including power storage device 10 will be described below in detail with reference to FIGS. 1 to 5B.

In the present exemplary embodiment, it is assumed as an example that power supply 101 is a storage battery (vehicle-mounted battery) that is mounted on vehicle body 91 and that outputs a direct-current (DC) voltage. Power supply 101 of this type is rechargeable by being supplied with, for example, electric power input from the outside of vehicle body 91, electric power generated by a generator while vehicle body 91 is running, regenerative electric power generated by an electric motor, or the like. Further, in the present exemplary embodiment, it is assumed as an example that load 102 is a brake system that is mounted on vehicle body 91 and that operates by the DC voltage applied thereto. The "brake system" used in the present disclosure indicates a system used for braking vehicle body 91, and includes, for example, a hydraulic pump, a motor, an electronic control unit (ECU), a hydraulic booster, a brake actuator, and the like.

(2.1) Basic Configuration

Power storage device 10 includes input terminal 11, output terminal 12, first circuit 21, and second circuit 22 as described above.

In the present exemplary embodiment, all of the plurality of elements constituting power storage device 10 are housed in one housing 100 (see FIG. 2). Housing 100 is fixed to vehicle body 91 as shown in FIG. 2. Power supply 101 and load 102 are mounted on vehicle body 91 together with power storage device 10. Power supply 101 and load 102 are electrically connected by main circuit 92. Power storage device 10 connects power supply 101 and load 102 via a path different from main circuit 92.

As shown in FIG. 1, input terminal 11 is electrically connected to power supply 101. In the present exemplary embodiment, power supply 101 is a DC power supply that outputs a DC voltage, and a positive electrode of power supply 101 is electrically connected to input terminal 11. On the other hand, output terminal 12 is electrically connected to load 102. In the present exemplary embodiment, load 102 is a DC load that operates by a DC voltage applied thereto, and a positive electrode of load 102 is electrically connected to output terminal 12. That is, power storage device 10 according to the present exemplary embodiment is electrically connected between the positive electrode of power supply 101 and the positive electrode of load 102.

First circuit 21 and second circuit 22 are electrically connected in parallel. And each of first circuit 21 and second circuit 22 is disposed between input terminal 11 and output terminal 12. In the present exemplary embodiment, power supply 101 and load 102 are electrically connected by main circuit 92. Thus, three circuits, that is, first circuit 21, second circuit 22, and main circuit 92, are electrically connected in parallel between power supply 101 and load 102 as shown in FIG. 1.

Figure 3A:
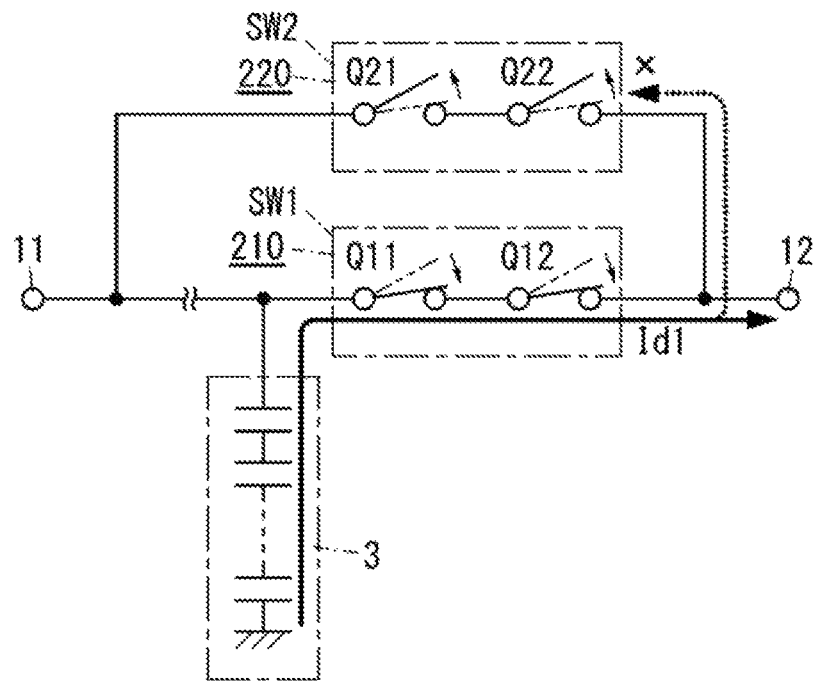
FIG. 3A is an explanatory diagram showing an operation when a first switch in the power storage device according to the first exemplary embodiment is in ON state.

First circuit 21 includes power storage unit 3 and discharge path 210 (see FIG. 3A) as described above. First circuit 21 further includes charging circuit 6 as shown in FIG. 1. Discharge path 210 is a path that allows discharge current Id1 from power storage unit 3 to flow toward output terminal 12, as shown in FIG. 3A. The "discharge current" used in the present disclosure means a current output from power storage unit 3 when power storage unit 3 releases electric energy stored in power storage unit 3, that is, when power storage unit 3 is discharged. Charging circuit 6 allows charging current Ic1 (see FIG. 3B) to flow from input terminal 11 to power storage unit 3. The "charging current" used in the present disclosure means a current input to power storage unit 3 when power storage unit 3 accumulates electric energy, that is, when power storage unit 3 is charged. Briefly, charging circuit 6 is a circuit that charges power storage unit 3 by supplying charging current Ic1 to power storage unit 3.

Figure 3B:
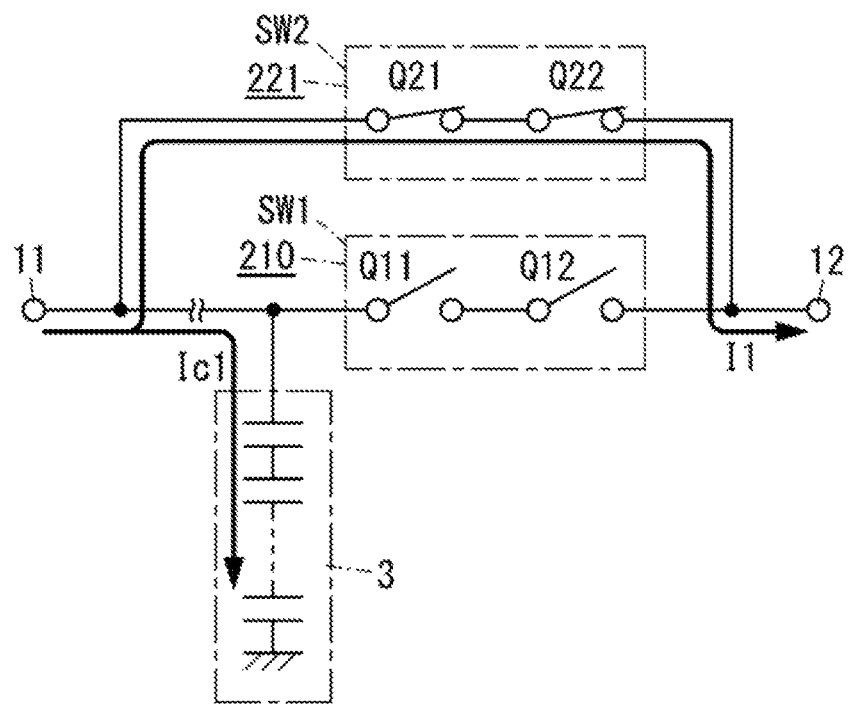
FIG. 3B is an explanatory diagram showing an operation when a second switch in the power storage device according to the first exemplary embodiment is in ON state.

Here, first circuit 21 has first switch SW1. First switch SW1 is disposed between input terminal 11 and output terminal 12, and forms discharge path 210 when turned on. That is, first circuit 21 includes power storage unit 3, first switch SW1, and charging circuit 6. Charging circuit 6 and first switch SW1 are electrically connected in series between input terminal 11 and output terminal 12. Power storage unit 3 is electrically connected to a connection point of charging circuit 6 and first switch SW1, and disposed between the connection point and a reference potential point (ground). As a result, when first switch SW1 is in ON state, electrical continuity between power storage unit 3 and output terminal 12 is established, and thus discharge path 210 is formed, as shown in FIG. 3A. This enables discharge current Id1 from power storage unit 3 to flow toward output terminal 12. On the other hand, when first switch SW1 is in OFF state, the electrical continuity between power storage unit 3 and output terminal 12 is not established, and thus discharge path 210 is cut off, as shown in FIG. 3B. Thus, discharge current Id1 from power storage unit 3 does not flow toward output terminal 12.

Specifically, first switch SW1 includes a pair of first switching elements Q11 and Q12 electrically connected in series. Each of first switching elements Q11 and Q12 is, for example, a semiconductor element including an enhancement type n-channel metal-oxide-semiconductor field effect transistor (MOSFET). In this case, the pair of first switching elements Q11 and Q12 is connected in so called anti-series connection between power storage unit 3 and output terminal 12. That is, the sources of the pair of first switching elements Q11 and Q12 are connected to each other, the drain of first switching element Q11 is connected to power storage unit 3, and the drain of first switching element Q12 is connected to output terminal 12. In the configuration where first switch SW1 includes the pair of first switching elements Q11 and Q12 as described above, when first switching elements Q11 and Q12 are both in a conducting state, first switch SW1 is turned on. On the other hand, when at least one of first switching elements Q11 and Q12 is in a non-conducting state, first switch SW1 is turned off.

Further, due to the configuration in which first switch SW1 includes the pair of first switching elements Q11 and Q12 electrically connected in series as described above, it is also possible to detect an open circuit fault and a short circuit fault of each of the pair of first switching elements Q11 and Q12.

In the present exemplary embodiment, power storage unit 3 is, as an example, an electrochemical device (power storage device) having a higher output density than a lithium ion battery (LIB) or the like. In the present exemplary embodiment, power storage unit 3 is a capacitor, and includes multiple cells which are electrically connected in series. In particular, in the present exemplary embodiment, power storage unit 3 is an electrochemical device having a higher energy density than an electrochemical device such as an electric double layer capacitor (EDLC). The electrochemical device used as power storage unit 3 will be briefly described below.

This electrochemical device includes a positive electrode member, a negative electrode member, and a nonaqueous electrolytic solution. The positive electrode member has a positive current collector and a positive electrode material layer supported on the positive current collector and containing a positive electrode active material. The positive electrode material layer contains a conductive polymer as a positive electrode active material for doping and dedoping anions (dopants). The negative electrode member has a negative electrode material layer containing a negative electrode active material. The negative electrode active material is, for example, a material that undergoes a redox reaction accompanied by adsorption and desorption of lithium ions, and specific examples thereof include a carbon material, a metal compound, an alloy, and a ceramic material. The nonaqueous electrolytic solution has lithium ion conductivity, for example. This type of nonaqueous electrolytic solution contains a lithium salt and a nonaqueous solution for dissolving the lithium salt.

As shown in FIG. 1, charging circuit 6 has diode D1, switching element Q1, and resistor R1. Diode D1, switching element Q1, and resistor R1 are electrically connected in series between input terminal 11 and power storage unit 3. An anode of diode D1 is electrically connected to input terminal 11, and a cathode of diode D1 is electrically connected to switching element Q1. Switching element Q1 is, for example, a semiconductor element including an enhancement type n-channel MOSFET. One end of resistor R1 opposite to switching element Q1 is electrically connected to the positive electrode of power storage unit 3. Accordingly, when switching element Q1 is in ON state, charging current Ic1 flows from input terminal 11 toward power storage unit 3, and thus, power storage unit 3 can be charged.

Charging circuit 6 charges power storage unit 3 by appropriately turning on switching element Q1 in a "steady state" described later. Charging circuit 6 appropriately charges power storage unit 3 so as to maintain a relative state of charge (RSOC) of power storage unit 3 at a predetermined value. However, charging circuit 6 does not charge power storage unit 3 at least during the period when first switch SW1 is in ON state.

Second circuit 22 includes blocking path 220 (see FIG. 3A) as described above. As shown in FIG. 3A, blocking path 220 prevents discharge current Id1 of power storage unit 3 from flowing toward input terminal 11. In FIG. 3A, discharge current Id1 is indicated by a broken line, and a "x"

mark is illustrated, in order to conceptually represent that blocking path 220 blocks discharge current Id1. That is, second circuit 22 includes blocking path 220, so that electric power output from power storage unit 3 is prevented from flowing back to power supply 101 through second circuit 22 when power storage unit 3 is discharged.

Here, second circuit 22 has second switch SW2. Second switch SW2 is disposed between input terminal 11 and output terminal 12, and forms blocking path 220 when turned off. Further, second switch SW2 forms current path 221 (see FIG. 3B) through which a current flows from input terminal 11 to output terminal 12 when turned on. In other words, second circuit 22 includes blocking path 220 and current path 221, and these two paths can be switched by second switch SW2. One end of second switch SW2 is connected to input terminal 11, and the other end of second switch SW2 is connected to output terminal 12. As a result, when second switch SW2 is in ON state, electrical continuity between input terminal 11 and output terminal 12 is established, so that current path 221 is formed, as shown in FIG. 3B. This enables a current (bypass current I1) to flow toward output terminal 12 from input terminal 11. At this time, there is electrical continuity between power supply 101 and load 102, and a current flows from power supply 101 to load 102 through second circuit 22. On the other hand, when second switch SW2 is turned off, electrical continuity is not established between input terminal 11 and output terminal 12, so that current path 221 is cut off, and blocking path 220 is formed, as shown in FIG. 3A. Thus, a current does not flow between input terminal 11 and output terminal 12. At this time, blocking path 220 blocks both bypass current I1 flowing from input terminal 11 to output terminal 12 and discharge current Id1 from power storage unit 3.

Specifically, second switch SW2 includes a pair of second switching elements Q21 and Q22 electrically connected in series. Each of second switching elements Q21 and Q22 is, for example, a semiconductor element including an enhancement type n-channel MOSFET. In this case, the pair of second switching elements Q21 and Q22 is connected in so called anti-series connection between input terminal 11 and output terminal 12. That is, the sources of the pair of second switching elements Q21 and Q22 are connected to each other, the drain of second switching element Q21 is connected to input terminal 11, and the drain of second switching element Q22 is connected to output terminal 12. In the configuration where second switch SW2 includes the pair of second switching elements Q21 and Q22 as described above, when second switching elements Q21 and Q22 are both in a conducting state, second switch SW2 is turned on. On the other hand, when at least one of second switching elements Q21 and Q22 is in a non-conducting state, second switch SW2 is turned off.

Further, due to the configuration in which second switch SW2 includes the pair of second switching elements Q21 and Q22 electrically connected in series as described above, it is also possible to detect an open circuit fault and a short circuit fault of each of the pair of second switching elements Q21 and Q22.

Main circuit 92 has switch SW3 as shown in FIG. 1. Switch SW3 of main circuit 92 is controlled by, for example, an ECU. Switch SW3 is implemented by, for example, a semiconductor relay (solid-state relay (SSR)) using a semiconductor switching element, or a contact of a mechanical relay.

Here, load 102 connected to main circuit 92 may be different from load 102 connected to power storage device 10. That is, main circuit 92 may be electrically connected between power supply 101 and a first load, and power storage device 10 may be electrically connected between power supply 101 and a second load. In such a case, it is preferable that the output of power storage device 10 is switchable to the first load from the second load in order to achieve a redundant power supply to the first load.

Power storage device 10 configured as described above maintains first switch SW1 in OFF state in the "steady state" where electric power is normally supplied from power supply 101 to input terminal 11. Thus, in the steady state, power storage device 10 turns on only second switch SW2 to form current path 221. Thus, bypass current I1 flows from input terminal 11 to output terminal 12, but power storage unit 3 is not discharged.

On the other hand, in an "anomaly state" where power supply from power supply 101 to input terminal 11 is stopped due to, for example, a failure in supplying power or the like, power storage device 10 turns on first switch SW1 to form discharge path 210. The "power supply being stopped" used in the present disclosure means not only a state in which electric power supplied from power supply 101 to input terminal 11 is completely lost, but also a state in general in which electric power input from power supply 101 to input terminal 11 reduces to such an extent as to impair the operation of load 102. Further, in the anomaly state, power storage device 10 maintains second switch SW2 in OFF state to form blocking path 220, thereby preventing electric power output, which is from power storage unit 3, from flowing back to power supply 101 through second circuit 22.

That is, in the "steady state", power storage device 10 enables electric power supply from power supply 101 to load 102 by forming current path 221 as the bypass path. Further, even in the "anomaly state" where a failure in supplying power or the like occurs, power storage device 10 can also supply backup electric power from power storage unit 3 to load 102 to cover electric power supply to load 102 by forming discharge path 210 as a backup path.

Meanwhile, in power storage device 10 according to the present exemplary embodiment, blocking path 220 is formed when second circuit 22 turns off second switch SW2 as described above. Thus, while second switch SW2 is in ON state, blocking path 220 does not function.

Hence, during transition from the "steady state" to the "anomaly state", if the switching of first switch SW1 from OFF to ON and the switching of second switch SW2 from ON to OFF are simultaneously carried out, troubles may occur. That is, there may be a period in which both first switch SW1 and second switch SW2 are in ON state during transition from the "steady state" to the "anomaly state", depending on individual differences among elements (components) used as first switch SW1 and second switch SW2. In this case, discharge path 210 may be formed before blocking path 220 is formed, and as a result, electric power from power storage unit 3 may flow back to input terminal 11 (power supply 101) via first switch SW1 and second switch SW2. To address the above problem, power storage device 10 according to the present exemplary embodiment employs the configuration described below.

Figure 4:
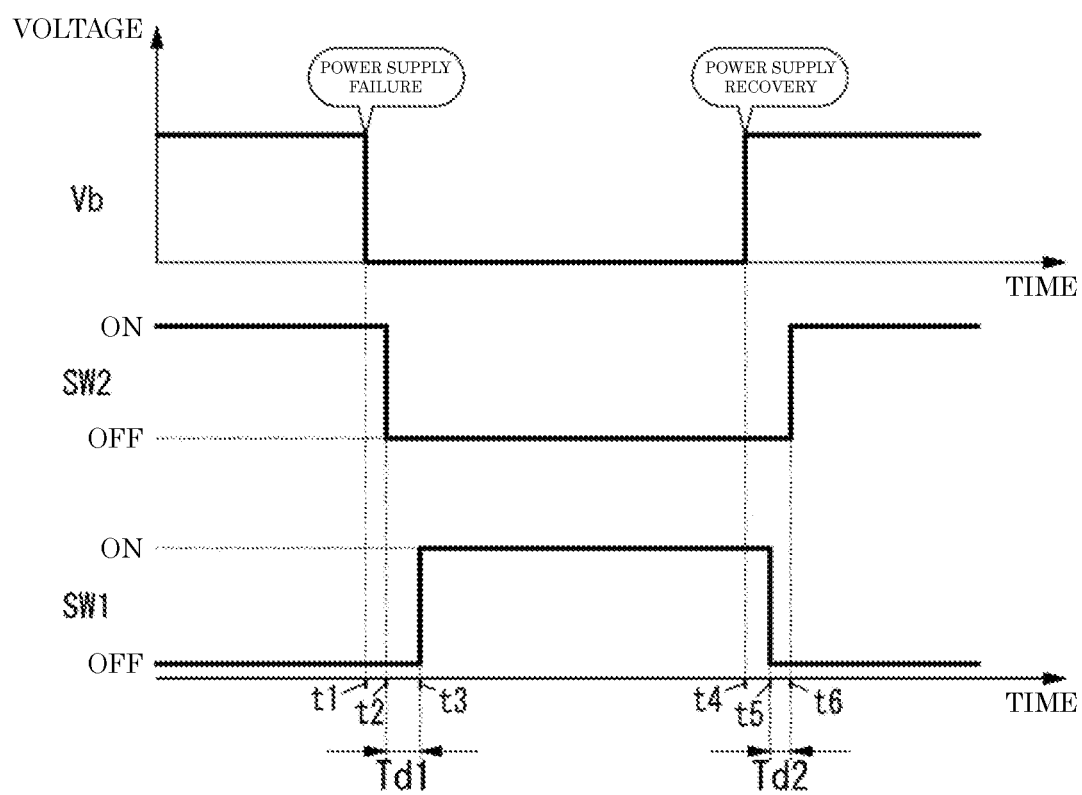
FIG. 4 is a timing chart showing the operation of the power storage device according to the first exemplary embodiment.

That is, in power storage device 10, when the power supply from power supply 101 to input terminal 11 is stopped, second switch SW2 is turned off to form blocking path 220, and then first switch SW1 is turned on to form discharge path 210. That is, power storage device 10 generates a time difference between the switching timing of first switch SW1 and the switching timing of second switch SW2 without simultaneously switching first switch SW1 and second switch SW2 during transition from the "steady state" to the "anomaly state" where the power supply from power supply 101 to input terminal 11 is stopped. In other words, power storage device 10 generates dead time Td1 in which both first switch SW1 and second switch SW2 are in OFF state at least during the transition from the "steady state" to the "anomaly state", as shown in FIG. 4. FIG. 4 which has a horizontal axis indicating a time shows input voltage Vb applied to input terminal 11, the ON/OFF state of second switch SW2, and the ON/OFF state of first switch SW1 in order from the top.

In FIG. 4, second switch SW2 is in ON state and first switch SW1 is in OFF state in the "steady state" before time t1. When the "failure in supplying power" occurs at time t1 and thus input voltage Vb drops, second switch SW2 first switches from ON state to OFF state at subsequent time t2. Further, at subsequent time t3, first switch SW1 switches from OFF state to ON state. As a result, the period from time t2 to time t3 becomes dead time Td1 in which both first switch SW1 and second switch SW2 are in OFF state.

As a result, it is possible to prevent the formation of discharge path 210 before the formation of blocking path 220, which can prevent the electric power, which is from power storage unit 3, from flowing back to input terminal 11 (power supply 101) through first switch SW1 and second switch SW2.

Further, power storage device 10 according to the present exemplary embodiment also generates dead time Td2 in which both first switch SW1 and second switch SW2 are in OFF state during the transition from the "anomaly state" to the "steady state", as shown in FIG. 4. In FIG. 4, when the "power supply recovery" occurs at time t4 and input voltage Vb rises, first switch SW1 first switches from ON state to OFF state at subsequent time t5. Further, at subsequent time t6, second switch SW2 switches from OFF state to ON state. As a result, the period from time t5 to time t6 becomes dead time Td2 in which both first switch SW1 and second switch SW2 are in OFF state.

Here, dead time Td1 during transition from the "steady state" to the "anomaly state" and dead time Td2 during transition from the "anomaly state" to the "steady state" may have the same time length or different time lengths.

(2.2) Specific Configuration

Next, a specific configuration for generating a time difference between the switching timing of first switch SW1 and the switching timing of second switch SW2 as described above will be described with reference to FIGS. 5A and 5B.

Figure 5A:
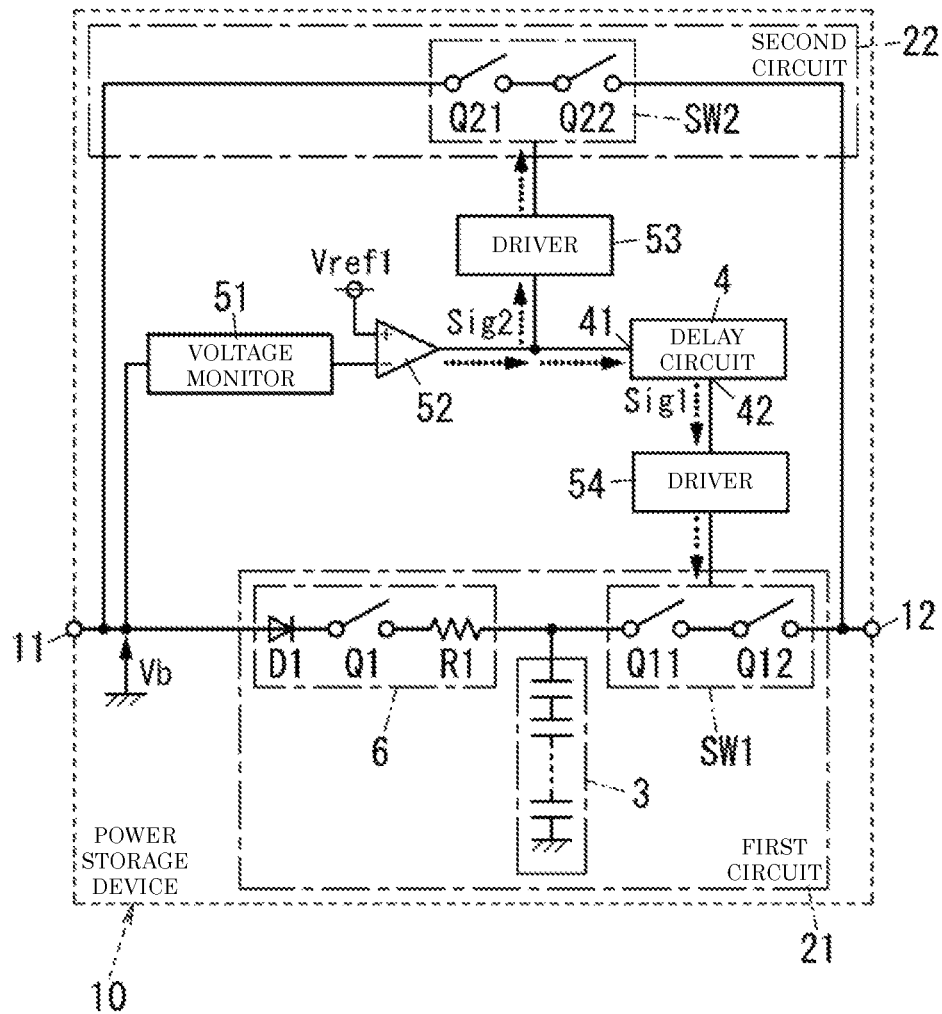
FIG. 5A is a circuit diagram illustrating the configuration of the power storage device according to the first exemplary embodiment.

As shown in FIG. 5A, power storage device 10 according to the present exemplary embodiment includes delay circuit 4, voltage monitor 51, comparator 52, and two drivers 53 and 54, in addition to input terminal 11, output terminal 12, first circuit 21, and second circuit 22.

Voltage monitor 51 monitors the magnitude of input voltage Vb to be applied to input terminal 11. For example, in the "anomaly state" where power supply from power supply 101 to input terminal 11 is stopped due to a failure in supplying power or the like, input voltage Vb monitored by voltage monitor 51 is significantly reduced. However, there may be a case where, even if the power supply from power supply 101 to input terminal 11 is stopped, input voltage Vb does not immediately become zero.

Comparator 52 compares the magnitude of input voltage Vb monitored by voltage monitor 51 with the magnitude of reference voltage Vref1. Comparator 52 outputs a signal having a low signal level when input voltage Vb is equal to or greater than reference voltage Vref1. On the other hand, if input voltage Vb is less than reference voltage Vref1, comparator 52 outputs a signal having a high signal level.

The output terminal of comparator 52 is electrically connected to second switch SW2 via driver 53, and is electrically connected to first switch SW1 via delay circuit 4 and driver 54.

Driver 53 is electrically connected to a control terminal of second switch SW2 (gates of second switching elements Q21 and Q22) and drives second switch SW2. Driver 53 turns off second switch SW2 when the signal level of the input signal is high, and turns on second switch SW2 when the signal level of the input signal is low. That is, driver 53 turns off second switch SW2 (second switching elements Q21 and Q22) when a high-level signal is input from comparator 52. A high-level signal input to driver 53, which is a signal for turning off second switch SW2, is also referred to as "second OFF signal Sig2".

Driver 54 is electrically connected to a control terminal of first switch SW1 (gates of first switching elements Q11 and Q12) and drives first switch SW1. Driver 54 turns off first switch SW1 when the signal level of the input signal is high, and turns on first switch SW1 when the signal level of the input signal is low. That is, driver 54 turns on first switch SW1 (first switching elements Q11 and Q12) when a low-level signal is input from delay circuit 4. A low-level signal input to driver 54, which is a signal for turning on first switch SW1, is also referred to as "first ON signal Sig1".

Delay circuit 4 has a time constant. When the power supply is stopped, delay circuit 4 delays a generation of first ON signal Sig1 for turning on first switch SW1 with respect to a generation of second OFF signal Sig2 for turning off second switch SW2 by a delay time corresponding to the time constant. Delay circuit 4 delays the signal input to input terminal 41 by the delay time and outputs the delayed signal from output terminal 42. Input terminal 41 of delay circuit 4 is electrically connected to the output terminal of comparator 52. Output terminal 42 of delay circuit 4 is electrically connected to driver 54. Further, in the present exemplary embodiment, delay circuit 4 has, as an example, a function as an inverter that inverts the level of the signal input to input terminal 41 between high and low and outputs the inverted signal from output terminal 42.

As a result, when the power supply from power supply 101 to input terminal 11 is stopped and input voltage Vb falls below reference voltage Vref1, the high-level signal output from comparator 52 is delayed by delay circuit 4 by the delay time, and input to driver 54 as a low-level signal. Thus, the low-level signal (first ON signal Sig1) input to driver 54 is delayed with respect to the high-level signal (second OFF signal Sig2) input to driver 53 by the delay time.

Figure 5B:
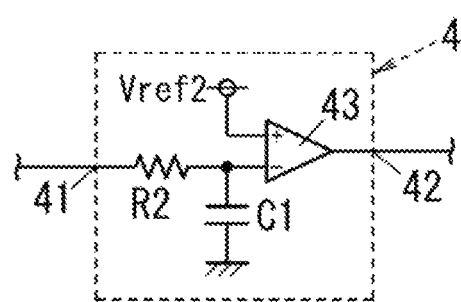
FIG. 5B is a circuit diagram illustrating a configuration of a delay circuit of the power storage device according to the first exemplary embodiment.

More specifically, delay circuit 4 has resistor R2, capacitor C1, and comparator 43, as shown in FIG. 5B. That is, delay circuit 4 is an RC delay circuit having a time constant determined by the circuit constants of resistor R2 and capacitor C1. Input terminal 41 of delay circuit 4 is electrically connected to comparator 43 via resistor R2. Capacitor C1 is electrically connected to a connection point of resistor R2 and comparator 43, and disposed between the connection point and the reference potential (ground).

Comparator 43 compares the magnitude of the voltage across capacitor C1 with the magnitude of reference voltage Vref2. If the voltage across capacitor C1 is equal to or higher than reference voltage Vref2, comparator 43 outputs a signal having a low signal level. On the other hand, if the voltage across capacitor C1 is less than reference voltage Vref2, comparator 43 outputs a signal having a high signal level. The output terminal of comparator 43 is output terminal 42 of delay circuit 4.

Thus, when the high-level signal is input from comparator 52, delay circuit 4 outputs a low-level signal after the lapse of the delay time if the voltage across capacitor C1 becomes equal to or higher than reference voltage Vref2.

As described above, delay circuit 4 delays first ON signal Sig1 with respect to second OFF signal Sig2 by the delay time corresponding to the time constant, whereby a time difference corresponding to the delay time is generated between the switching timing of first switch SW1 and the switching timing of second switch SW2. In other words, dead time Td1 corresponding to the delay time is set during transition from the "steady state" to the "anomaly state". Further, dead time Td2 corresponding to the delay time is also set during transition from the "anomaly state" to the "steady state".

In particular, when delay circuit 4 described above is used in a configuration in which first circuit 21 and second circuit 22 are integrally provided as in power storage device 10 according to the present exemplary embodiment, first circuit 21 and second circuit 22 can be operated in conjunction with each other only by a hardware configuration of power storage device 10. That is, power storage device 10 can generate a time difference between the switching timing of first switch SW1 and the switching timing of second switch SW2 without the intervention of an ECU or the like.

(3) Modification

The first exemplary embodiment is only one of the various exemplary embodiments of the present disclosure. The first exemplary embodiment can be variously modified according to the design and the like as long as the object of the present disclosure can be achieved. The modifications described below can be applied in combination as appropriate.

(3.1) First Modification

Power storage device 10A according to a first modification of the first exemplary embodiment is different from power storage device 10 according to the first exemplary embodiment in a determination condition for determining that the power supply is stopped. Hereinafter, elements similar to those in the first exemplary embodiment are given identical reference signs, and description of such elements is omitted as appropriate.

In power storage device 10A according to the first modification, it is premised that load 102 (see FIG. 1) includes a limited load whose current consumption is limited when power supply is stopped. In power storage device 10A, the determination condition for determining that the power supply is stopped includes a condition that the current consumption of the limited load is limited. That is, in power storage device 10A, the determination condition for determining that the power supply is stopped includes not only a condition that input voltage Vb monitored by voltage monitor 51 decreases and falls below reference voltage Vref1, but also a condition that the current consumption of the limited load is limited.

As an example, when load 102 is a brake system, load 102 may have a function of limiting the current consumption of the brake system when an anomaly such as a failure in supplying power occurs. That is, when the brake system operates at maximum current without any limitation in the event of an anomaly, backup power (electric energy stored in power storage unit 3) may be instantly depleted, so that a predetermined backup time cannot be ensured. Therefore, in this type of brake system, when an anomaly occurs, the ECU limits the current consumption of a hydraulic pump to be smaller than that in a steady state, for example, in order to ensure a predetermined backup time. In this case, the hydraulic pump corresponds to the limited load, and a function of "current limitation" for limiting the current consumption of the limited load is activated in the event of an anomaly. As an example, the ECU activates the function of the "current limitation" to limit the current consumption of the limited load (hydraulic pump), when input voltage Vb falls below a threshold. In this case, the threshold is preferably greater than reference voltage Vref1.

Therefore, in a case where the limited load described above is included in load 102, power storage device 10A forms discharge path 210 after the function of the "current limitation" is activated. To this end, power storage device 10A includes, as a determination condition for determining that the power supply is stopped, the condition that the current consumption of the limited load is limited. That is, power storage device 10A does not determine that the power supply is stopped only when input voltage Vb is lower than reference voltage Vref1. When input voltage Vb is lower than reference voltage Vref1, and the current consumption of the limited load is limited, power storage device 10A determines that the power supply is stopped.

Figure 6:
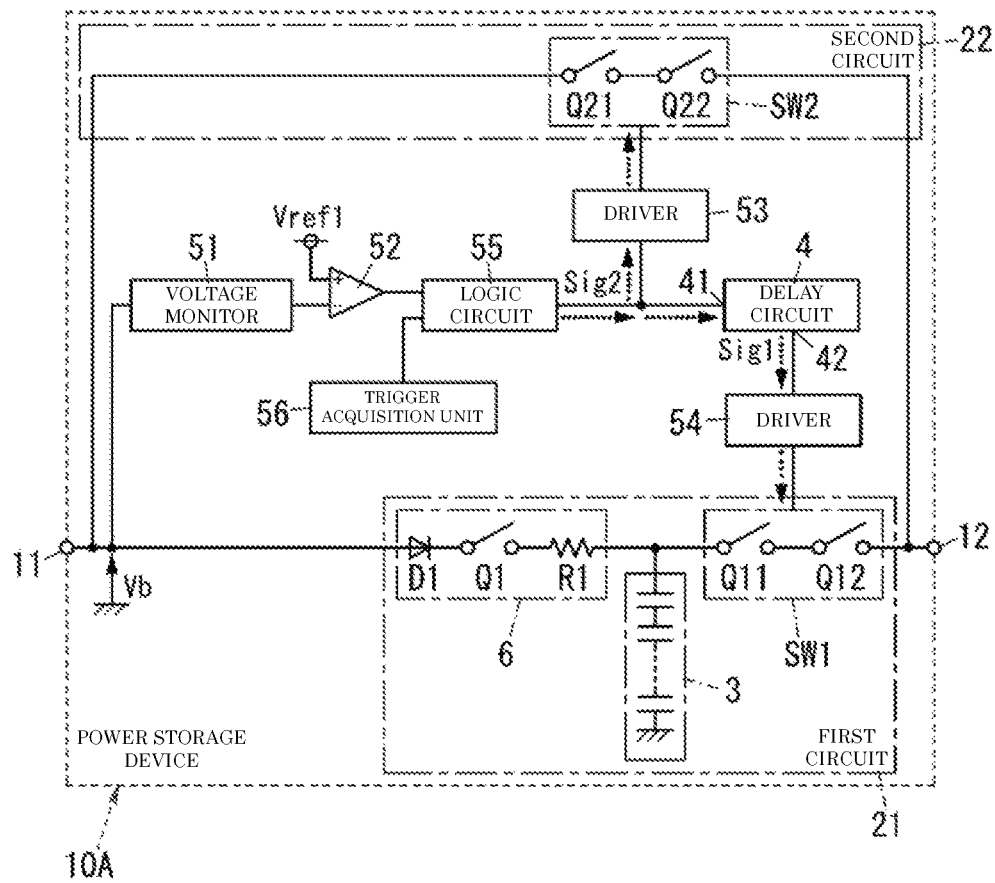
FIG. 6 is a circuit diagram illustrating a configuration of a power storage device according to a first modification of the first exemplary embodiment.

Specifically, as shown in FIG. 6, power storage device 10A is obtained by adding logic circuit 55 and trigger acquisition unit 56 to the configuration of power storage device 10 according to the first exemplary embodiment.

Logic circuit 55 is disposed between the output terminal of comparator 52 and a connection point of driver 53 and delay circuit 4. Logic circuit 55 is an AND circuit, and outputs a high-level signal only when both signals input to its two input terminals are at a high level. One of the two input terminals of logic circuit 55 is connected to the output terminal of comparator 52, and the other is connected to trigger acquisition unit 56. That is, logic circuit 55 outputs a high-level signal, only when comparator 52 outputs a high-level signal, and trigger acquisition unit 56 outputs a high-level signal.

Trigger acquisition unit 56 acquires a trigger signal from outside power storage device 10A. For example, in a case where the ECU activates the function of the "current limitation" to limit the current consumption of the limited load (hydraulic pump) as described above, the ECU generates a trigger signal when the function of the "current limitation" is activated. When acquiring (receiving) the trigger signal, trigger acquisition unit 56 outputs a high-level signal.

With the above configuration, power storage device 10A determines that the power supply is stopped when input voltage Vb is lower than reference voltage Vref1 and the current consumption of the limited load is limited, and turns on first switch SW1 to form discharge path 210.

(3.2) Second Modification

Figure 7:
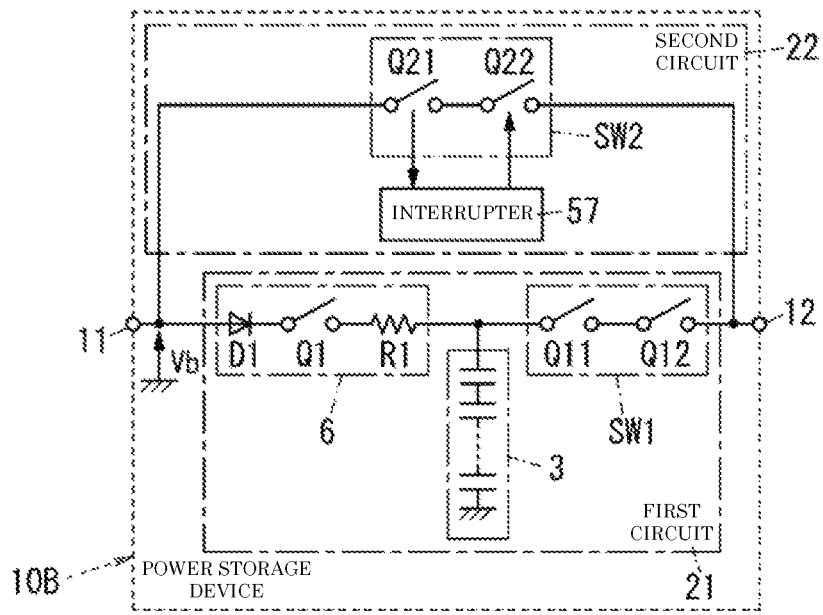
FIG. 7 is a circuit diagram illustrating a configuration of a power storage device according to a second modification of the first exemplary embodiment.

Power storage device 10B according to a second modification of the first exemplary embodiment is different from power storage device 10 according to the first exemplary embodiment in that second circuit 22 further includes interrupter 57 as shown in FIG. 7. Hereinafter, elements similar to those in the first exemplary embodiment are given identical reference signs, and description of such elements is omitted as appropriate.

Interrupter 57 interrupts current path 221 when an anomalous current flows through current path 221. The "anomalous current" used in the present disclosure indicates a current having an anomalous value compared to the rated current value of load 102, and includes an overcurrent, a short circuit current, and the like. Here, current path 221 (see FIG.

3B) is a path that allows a current to flow from input terminal 11 to output terminal 12, and is formed by second switch SW2 when second switch SW2 is turned on.

Hence, interrupter 57 monitors a current flowing through one of the pair of second switching elements Q21 and Q22 constituting second switch SW2, for example. When the current exceeds a determination threshold, interrupter 57 turns off at least one of the pair of second switching elements Q21 and Q22. The determination threshold is greater than at least the rated current value of load 102. Interrupter 57 is implemented by, for example, an analog circuit.

Here, the magnitude of the current flowing through each of second switching elements Q21 and Q22 can be detected on the basis of a decrease in voltages across second switching element Q21 and across second switching element Q22. That is, since each of second switching elements Q21 and Q22 has an ON-resistance, a voltage drop occurs according to the magnitude of the current flowing through each of second switching elements Q21 and Q22. As an example, interrupter 57 forcibly turns off second switching element Q22 when a decrease in voltage across second switching element Q21 exceeds a threshold. Accordingly, it is possible to prevent an anomalous current from flowing toward load 102 without providing, for example, a current interruption element, such as a fuse, outside power storage device 10B.

(3.3) Third Modification

Figure 8A:
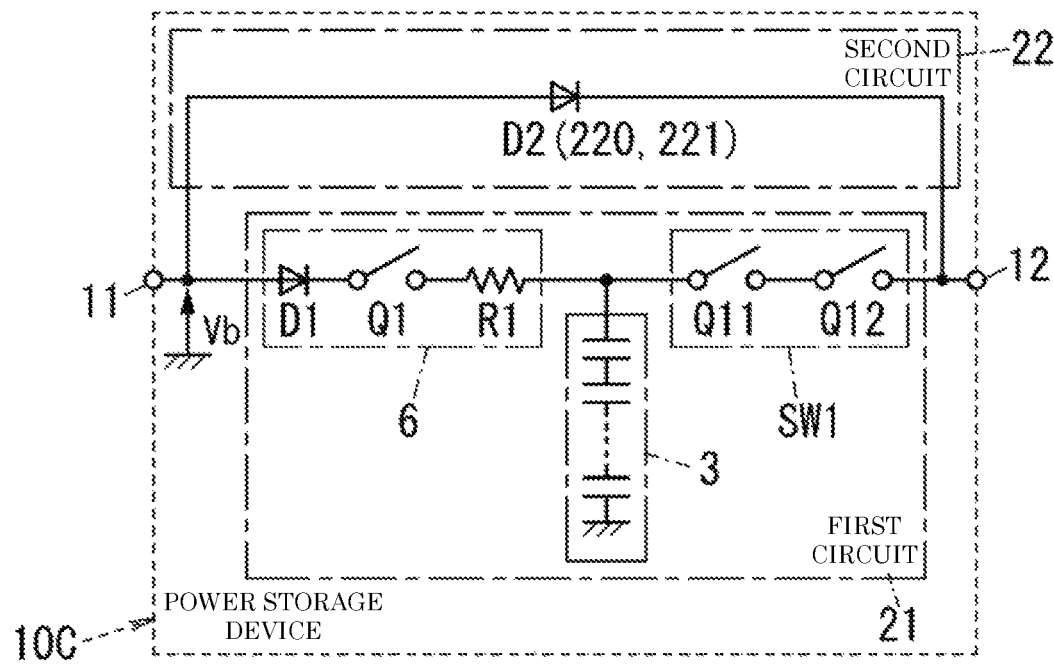
FIG. 8A is a circuit diagram illustrating a configuration of a power storage device according to a third modification of the first exemplary embodiment.

Power storage device 10C according to a third modification of the first exemplary embodiment is different from power storage device 10 according to the first exemplary embodiment in that second circuit 22 includes diode D2, in place of second switch SW2 (see FIG. 1), as shown in FIG. 8A. Hereinafter, elements similar to those in the first exemplary embodiment are given identical reference signs, and description of such elements is omitted as appropriate.

Diode D2 is disposed between input terminal 11 and output terminal 12 with an orientation to block a current flowing from output terminal 12 toward input terminal 11. That is, an anode of diode D2 is electrically connected to input terminal 11, and a cathode of diode D2 is electrically connected to output terminal 12. In this case, diode D2 is turned on when the potential of input terminal 11 is higher than the potential of output terminal 12 while the potential difference between input terminal 11 and output terminal 12 is not less than the forward voltage of diode D2. As a result, bypass current I1 flowing from input terminal 11 to output terminal 12 flows through diode D2. In other words, diode D2 forms current path 221 (see FIG. 3B) that allows a current to flow from input terminal 11 to output terminal 12, and blocking path 220 that prevents discharge current Id1 of power storage unit 3 from flowing toward input terminal 11.

Thus, in power storage device 10C according to the third modification, first circuit 21 has first switch SW1 that is disposed between input terminal 11 and output terminal 12 and that forms discharge path 210 when turned on. On the other hand, second circuit 22 has diode D2 that is disposed between input terminal 11 and output terminal 12 with an orientation to block a current flowing from output terminal 12 toward input terminal 11, and that forms blocking path 220. This configuration does not need a configuration for controlling diode D2.

Further, power storage device 10C according to the third modification may include diode D2 in place of only second switching element Q22 which is connected to output terminal 12 at the drain, among the pair of second switching elements Q21 and Q22 (see FIG. 1) constituting second switch SW2. That is, second switch SW2 may be composed of a series circuit of second switching element Q21 and diode D2. In this case, the parasitic diode of second switching element Q21 and diode D2 are in a relation of an anti-series connection.

(3.4) Fourth Modification

Figure 8B:
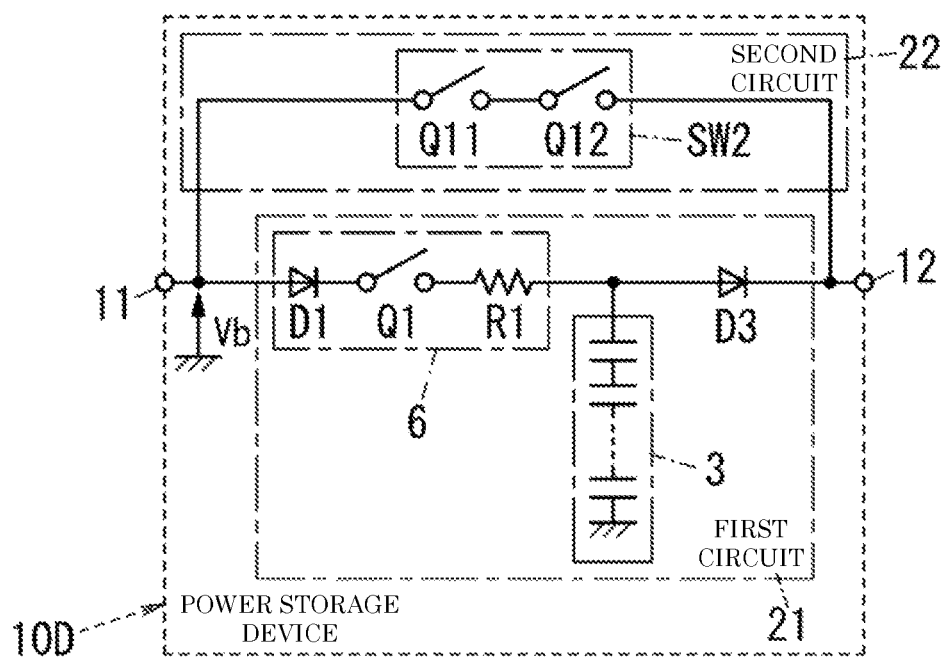
FIG. 8B is a circuit diagram illustrating a configuration of a power storage device according to a fourth modification of the first exemplary embodiment.

Power storage device 10D according to a fourth modification of the first exemplary embodiment is different from power storage device 10 according to the first exemplary embodiment in that first circuit 21 includes diode D3, in place of first switch SW1 (see FIG. 1), as shown in FIG. 8B. Hereinafter, elements similar to those in the first exemplary embodiment are given identical reference signs, and description of such elements is omitted as appropriate.

Diode D3 is disposed between power storage unit 3 (positive electrode thereof) and output terminal 12 with an orientation to block a current flowing from output terminal 12 toward power storage unit 3. That is, an anode of diode D3 is electrically connected to the positive electrode of power storage unit 3, and a cathode of diode D3 is electrically connected to output terminal 12. In this case, diode D3 is turned on when the potential of the positive electrode of power storage unit 3 is higher than the potential of output terminal 12 while the potential difference between the positive electrode of power storage unit 3 and output terminal 12 is not less than the forward voltage of diode D3. As a result, discharge current Id1 from power storage unit 3 flows toward output terminal 12 through diode D3. In other words, diode D3 forms discharge path 210 through which discharge current Id1 from power storage unit 3 flows toward output terminal 12 while blocking a current flowing from output terminal 12 toward power storage unit 3.

Further, power storage device 10D according to the fourth modification may include diode D3 in place of only first switching element Q12 which is connected to output terminal 12 at the drain, among the pair of first switching elements Q11 and Q12 (see FIG. 1) constituting first switch SW1. That is, first switch SW1 may be composed of a series circuit of first switching element Q11 and diode D3. In this case, the parasitic diode of first switching element Q11 and diode D3 are in a relation of an anti-series connection.

Further, power storage device 10D according to the fourth modification may be combined with the configuration of power storage device 10C according to the third modification. That is, second circuit 22 may have diode D2, and first circuit 21 may have diode D3.

(3.5) Other Modifications

Hereinafter, modifications other than the first to fourth modifications of the first exemplary embodiment will be listed.

Power storage unit 3 is not limited to the electrochemical device having the above-described configuration, and may be, for example, an electric double layer capacitor or a lithium ion capacitor. Further, power storage unit 3 is not limited to a capacitor, and may be a battery such as a lithium ion battery, a lead storage battery, or a lithium battery. Furthermore, power storage unit 3 may include a plurality of cells connected in series or in parallel.

Further, power storage device 10 is not limited to be mounted on automobiles (four-wheeled vehicles) and two-wheeled vehicles, and may be mounted on moving bodies such as trains, electric carts, aircrafts, drones, construction machines, or ships. Further, load 102 is not limited to the brake system, and may be, for example, a load of a steering system or an electric system of a moving body (including vehicle 9).

Further, power storage device 10 is not limited to be used for a moving body. Power storage device 10 may be used for, for example, a power conditioner that converts direct-current power from a distributed power supply such as a solar cell or a storage battery into alternating-current power and outputs the alternating-current power to load 102 (equipment such as home appliances, or a power system), etc.

Further, it is not always necessary for power storage device 10 that a plurality of components of power storage device 10 is housed in one housing 100. The components of power storage device 10 may be distributed and housed in a plurality of housings. For example, in power storage device 10, delay circuit 4 and the other circuits may be provided in separate housings.

Further, each of the pair of first switching elements Q11 and Q12 and the pair of second switching elements Q21 and Q22 is not limited to an enhancement type n-channel MOS-FET, and may be, for example, an insulated gate bipolar transistor (IGBT) or a thyristor. Further, each of the pair of first switching elements Q11 and Q12 and the pair of second switching elements Q21 and Q22 may be a semiconductor switching element using a wide bandgap semiconductor material such as gallium nitride (GaN). Further, each of the pair of first switching elements Q11 and Q12 and the pair of second switching elements Q21 and Q22 is not limited to a semiconductor element, but may be constituted by a contact of a mechanical relay, for example.

Second Exemplary Embodiment

Figure 9:
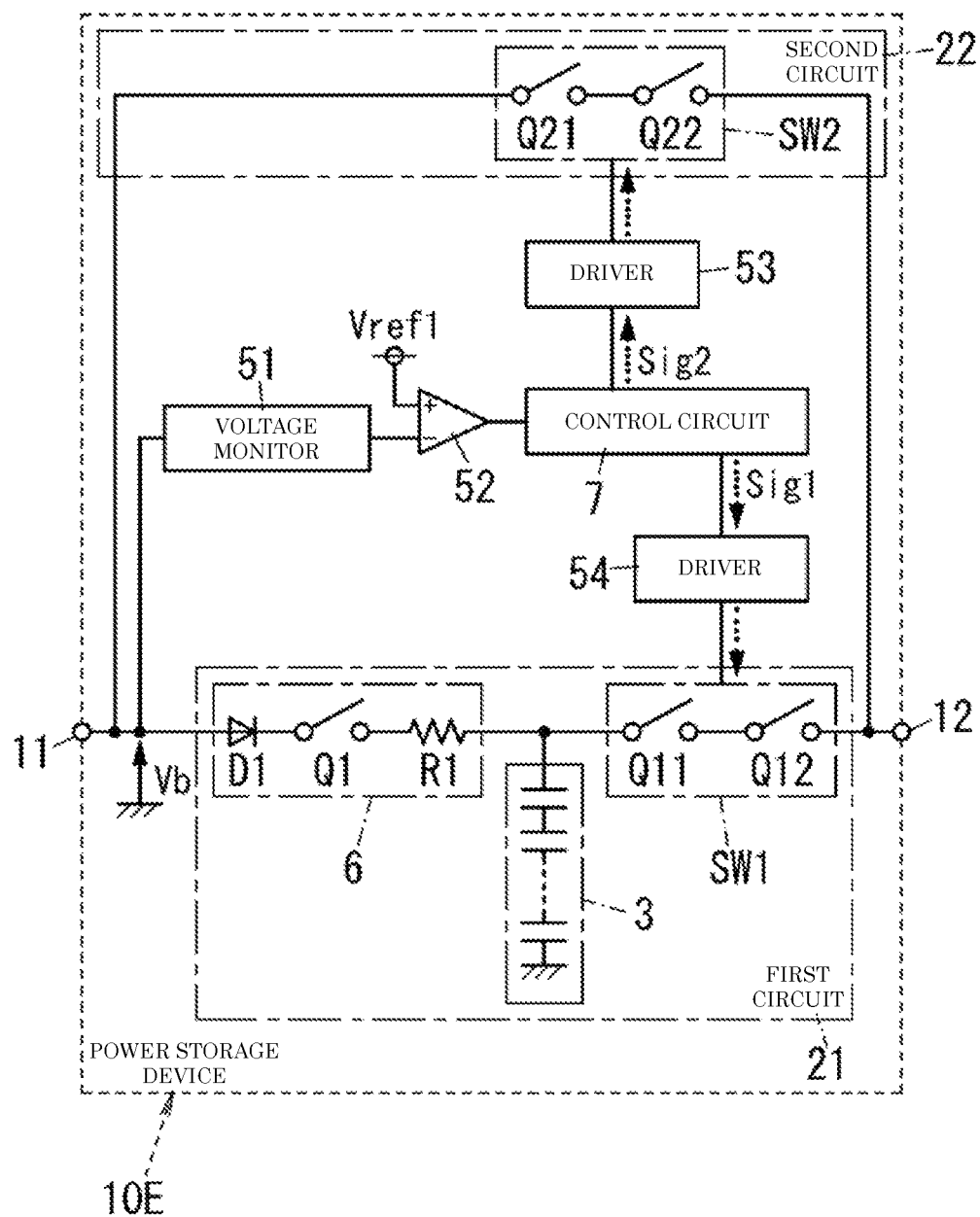
FIG. 9 is a circuit diagram illustrating a configuration of a power storage device according to a second exemplary embodiment.

Power storage device 10E according to the present exemplary embodiment is different from power storage device 10 according to the first exemplary embodiment in that control circuit 7 is used to generate a time difference between the switching timing of first switch SW1 and the switching timing of second switch SW2, as shown in FIG. 9. Hereinafter, elements similar to those in the first exemplary embodiment are given identical reference signs, and description of such elements is omitted as appropriate.

Power storage device 10E according to the present exemplary embodiment includes control circuit 7 instead of delay circuit 4 (see FIG. 5A). Control circuit 7 outputs first ON signal Sig1 for turning on first switch SW1 and second OFF signal Sig2 for turning off second switch SW2. Here, an output terminal of comparator 52 is electrically connected to control circuit 7. Triggered by the output from comparator 52 being at a high level, control circuit 7 outputs first ON signal Sig1 and second OFF signal Sig2.

Control circuit 7 is composed of, for example, a computer system (including a micro controller) including a central processing unit (CPU) and a memory. That is, the processor (CPU) functions as control circuit 7 by executing an appropriate program recorded in the memory.

Here, first switch SW1 includes a pair of first switching elements Q11 and Q12, and second switch SW2 includes a pair of second switching elements Q21 and Q22. Thus, control circuit 7 outputs control signals (including first ON signal Sig1 and second OFF signal Sig2) to the gates of first switching elements Q11 and Q12 and second switching elements Q21 and Q22 via drivers 53 and 54.

Meanwhile, when supplying power from power supply 101 to input terminal 11 is stopped, control circuit 7 outputs first ON signal Sig1 with a delay of a predetermined delay time after outputting second OFF signal Sig2. Here, the delay time is counted by, for example, a timer function of control circuit 7. That is, when the output from comparator 52 becomes a high level, control circuit 7 outputs second OFF signal Sig2 at first, and after counting the delay time, outputs first ON signal Sig1.

As a result, when supplying power from power supply 101 to input terminal 11 is stopped, and input voltage Vb falls below reference voltage Vref1, control circuit 7 sequentially outputs second OFF signal Sig2 and first ON signal Sig1 with a time difference corresponding to the delay time. Hence, the low-level signal (first ON signal Sig1) input to driver 54 is delayed with respect to the high-level signal (second OFF signal Sig2) input to driver 53 by the delay time.

As described above, control circuit 7 delays a generation of first ON signal Sig1 with respect to a generation of second OFF signal Sig2 by the delay time corresponding to the predetermined delay time. Thus, a time difference corresponding to the delay time is generated between the switching timing of first switch SW1 and the switching timing of second switch SW2. In other words, dead time Td1 corresponding to the delay time is set during transition from the "steady state" to the "anomaly state". Further, dead time Td2 corresponding to the delay time is also set during transition from the "anomaly state" to the "steady state".

The configuration described in the second exemplary embodiment is applicable by being appropriately combined with the configuration described in the first exemplary embodiment (including modifications).

Third Exemplary Embodiment

Figure 10:
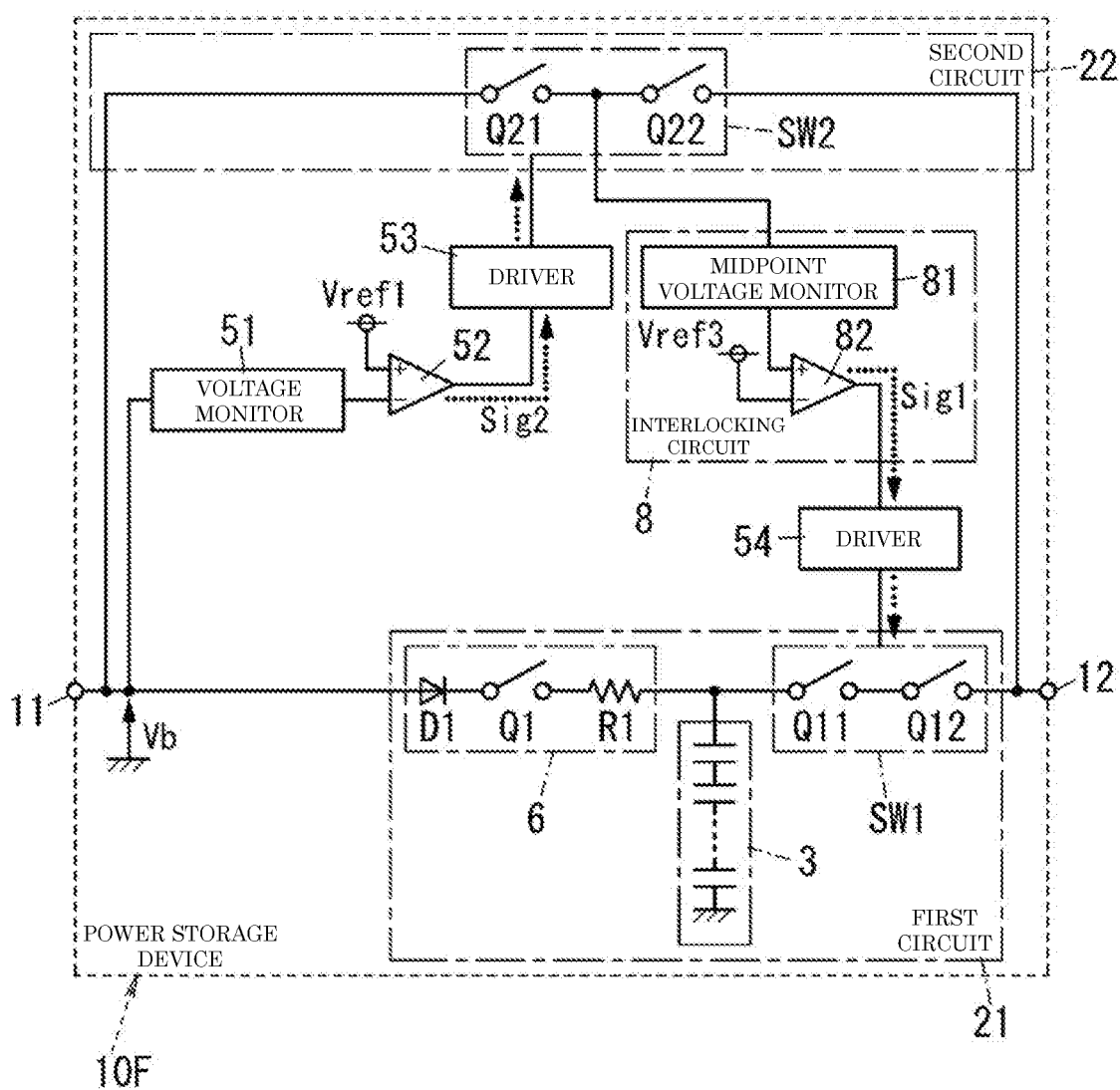
FIG. 10 is a circuit diagram illustrating a configuration of a power storage device according to a third exemplary embodiment.

Power storage device 10F according to the present exemplary embodiment is different from power storage device 10 according to the first exemplary embodiment in that interlocking circuit 8 is used to generate a time difference between the switching timing of first switch SW1 and the switching timing of second switch SW2, as shown in FIG. 10. Hereinafter, elements similar to those in the first exemplary embodiment are given identical reference signs, and description of such elements is omitted as appropriate.

Power storage device 10F according to the present exemplary embodiment includes interlocking circuit 8 instead of delay circuit 4 (see FIG. 5A). Interlocking circuit 8 has a function of driving first switch SW1. When the power supply from power supply 101 to input terminal 11 is stopped, interlocking circuit 8 detects that second switch SW2 is off and turns on first switch SW1.

In the present exemplary embodiment, an output terminal of comparator 52 is connected only to driver 53 among drivers 53 and 54. Comparator 52 outputs second OFF signal Sig2 for turning off second switch SW2 to driver 53. On the other hand, interlocking circuit 8 is connected to driver 54 instead of the output terminal of comparator 52. Interlocking circuit 8 is connected to second switch SW2 and detects that second switch SW2 is turned off. When detecting that second switch SW2 has been turned off, interlocking circuit 8 outputs first ON signal Sig1 for turning on first switch SW1 to driver 54.

Specifically, interlocking circuit 8 has midpoint voltage monitor 81 and comparator 82.

Midpoint voltage monitor 81 monitors the magnitude of a voltage applied to the connection point of the pair of second switching elements Q21 and Q22 constituting second switch SW2 with respect to the reference potential (ground). When second switch SW2 is in ON state, the connection point of second switching elements Q21 and Q22 has substantially the same potential as input terminal 11, so the voltage monitored by midpoint voltage monitor 81 is substantially the same as input voltage Vb. On the other hand, when second switch SW2 is in OFF state, the voltage monitored by midpoint voltage monitor 81 becomes substantially zero.

Comparator 82 compares the magnitude of the voltage monitored by midpoint voltage monitor 81 with the magnitude of reference voltage Vref3. When the voltage monitored by midpoint voltage monitor 81 is less than reference voltage Vref3, comparator 82 outputs a signal having a low level. On the other hand, when the voltage monitored by midpoint voltage monitor 81 is equal to or higher than reference voltage Vref3, comparator 82 outputs a signal having a high level.

The output terminal of comparator 82 is electrically connected to first switch SW1 via driver 54. Hence, when second switch SW2 is turned off and the voltage monitored by midpoint voltage monitor 81 falls below reference voltage Vref3, a low-level signal (first ON signal Sig1) is input to driver 54 from comparator 82. As a result, when the power supply from power supply 101 to input terminal 11 is stopped and input voltage Vb falls below reference voltage Vref1, second OFF signal Sig2 is input to driver 53 at first, so that second switch SW2 is turned off. Then, when detecting that second switch SW2 is turned off, interlocking circuit 8 inputs first ON signal Sig1 to driver 54, so that first switch SW1 is turned on. Thus, the low-level signal (first ON signal Sig1) input to driver 54 is delayed with respect to the high-level signal (second OFF signal Sig2) input to driver 53 by at least a time lag generated in interlocking circuit 8.

As described above, triggered by second switch SW2 being in OFF state, interlocking circuit 8 turns on first switch SW1. Hence, a time difference is generated between the switching timing of first switch SW1 and the switching timing of second switch SW2. In other words, dead time Td1 is set during transition from the "steady state" to the "anomaly state". Further, dead time Td2 is also set during transition from the "anomaly state" to the "steady state".

The configuration described in the third exemplary embodiment is applicable by being appropriately combined with the configuration described in the first exemplary embodiment (including modifications).

SUMMARY

As described above, power storage device (10, 10A to 10F) according to the first aspect includes input terminal (11), output terminal (12), first circuit (21), and second circuit (22). Input terminal (11) is electrically connected to power supply (101). Output terminal (12) is electrically connected to load (102). First circuit (21) and second circuit (22) are electrically connected in parallel. Each of first circuit (21) and second circuit (22) is disposed between input terminal (11) and output terminal (12). First circuit (21) includes power storage unit (3) and discharge path (210). Discharge path 210 is a path that allows discharge current (Id1) from power storage unit (3) to flow toward output terminal (12). Second circuit (22) includes blocking path (220). Blocking path (220) prevents discharge current (Id1) of power storage unit (3) from flowing toward input terminal (11).

According to this aspect, first circuit (21) includes discharge path (210) that allows discharge current (Id1) from power storage unit (3) to flow toward output terminal (12), whereby, even when a failure in supplying power or the like occurs, the supply of electric power to load (102) can be covered by electric power output from power storage unit (3). Moreover, since second circuit (22) includes blocking path (220) that prevents discharge current (Id1) of power storage unit (3) from flowing toward input terminal (11), the supply of electric power output from power storage unit (3) to power supply (101) can be prevented, even during discharging of power storage unit (3). Thus, according to power storage device (10, 10A to 10F), it is possible to reduce the reverse flow of electric power from power storage unit (3) to power supply (101).

According to a second aspect, in power storage device (10, 10A to 10F) according to the first aspect, first circuit (21) includes first switch (SW1) that is disposed between input terminal (11) and output terminal (12), and that forms discharge path (210) when turned on. Second circuit (22) includes second switch (SW2) that is disposed between input terminal (11) and output terminal (12), and that forms blocking path (220) when turned off. When supplying power from power supply (101) to input terminal (11) is stopped, second switch (SW2) is turned off to form blocking path (220), and then, first switch (SW1) is turned on to form discharge path (210).

According to this aspect, a time difference is generated between the switching timings of first switch (SW1) and second switch (SW2) without simultaneously switching both switches. Hence, even if, for example, there are individual differences among the elements used for first switch (SW1) and second switch (SW2), first switch (SW1) and second switch (SW2) are prevented from being simultaneously turned on.

According to a third aspect, power storage device (10, 10A to 10F) according to the second aspect further includes delay circuit (4) having a time constant. When supplying power is stopped, delay circuit (4) delays a generation of first ON signal (Sig1) for turning on first switch (SW1) with respect to a generation of second OFF signal (Sig2) for turning off second switch SW2 by a delay time corresponding to the time constant.

According to this aspect, a time difference can be generated between the switching timing of first switch (SW1) and the switching timing of second switch (SW2) by a relatively simple configuration of only providing delay circuit (4).

According to a fourth aspect, power storage device (10, 10A to 10F) according to the second aspect further includes control circuit (7). Control circuit (7) outputs first ON signal (Sig1) for turning on first switch (SW1) and second OFF signal (Sig2) for turning off second switch (SW2). When supplying power is stopped, control circuit (7) outputs first ON signal (Sig1) with a delay of a predetermined delay time after outputting second OFF signal (Sig2).

According to this aspect, a time difference can be generated between the switching timing of first switch (SW1) and the switching timing of second switch (SW2) by a relatively simple configuration of only providing control circuit (7).

According to a fifth aspect, power storage device (10, 10A to 10F) according to the second aspect further includes interlocking circuit (8) that drives first switch (SW1). When supplying power is stopped, interlocking circuit (8) turns on first switch (SW1) after detecting that second switch (SW2) is turned off.

According to this aspect, a time difference can be generated between the switching timing of first switch (SW1) and the switching timing of second switch (SW2) by a relatively simple configuration of only providing interlocking circuit (8).

According to a sixth aspect, in power storage device (10, 10A to 10F) according to any one of the second to fifth aspects, load (102) includes a limited load having current consumption that is limited when supplying power is stopped. A determination condition for determining that supplying power is stopped includes a condition that the current consumption of the limited load is limited.

This aspect can prevent first switch (SW1) from being turned on to form discharge path (210) before the current consumption of the limited load is limited.

According to a seventh aspect, in power storage device (10, 10A to 10F) according to the first aspect, first circuit (21) includes first switch (SW1) that is disposed between input terminal (11) and output terminal (12), and that forms the discharge path when turned on. Second circuit (22) has diode (D2). Diode (D2) is disposed between input terminal (11) and output terminal (12) with an orientation to block a current flowing from output terminal (12) toward input terminal (11), and forms blocking path (220).

According to this aspect, a configuration for setting the time difference between the switching timing of first switch (SW1) and the switching timing of second switch (SW2) is unnecessary, whereby blocking path (220) can be formed with a relatively simple configuration.

According to an eighth aspect, power storage device (10, 10A to 10F) according to any one of the first to seventh aspects, second circuit (22) further includes current path (221) and interrupter (57). Current path (221) is a path that allows a current to flow from input terminal (11) to output terminal (12). Interrupter (57) interrupts current path (221) when an anomalous current flows through current path (221).

According to this aspect, it is possible to prevent an anomalous current from flowing toward load (102) without providing, for example, a current interruption element, such as a fuse, outside power storage device (10, 10A to 10F).

Vehicle (9) according to a ninth aspect includes power storage device (10, 10A to 10F) according to any one of the first to eighth aspects, and vehicle body (91) provided with power storage device (10, 10A to 10F).

According to this aspect, first circuit (21) includes discharge path (210) that allows discharge current (Id1) of power storage unit (3) to flow toward output terminal (12), whereby, even when a failure in supplying power or the like occurs, the supply of electric power to load (102) can be covered by electric power output from power storage unit (3). Moreover, since second circuit (22) includes blocking path (220) that prevents discharge current (Id1) of power storage unit (3) from flowing toward input terminal (11), the supply of electric power output from power storage unit (3) to power supply (101) can be prevented, even during discharging of power storage unit (3). Thus, according to vehicle (9), it is possible to reduce the reverse flow of electric power from power storage unit (3) to power supply (101).

The configurations according to the second to eighth aspects are not always necessary for power storage device (10, 10A to 10F), and can be omitted as appropriate.

What is claimed is:

1. A power storage device comprising:
    an input terminal that is to be electrically connected to a power supply;
    an output terminal that is to be electrically connected to a load; and
    a first circuit and a second circuit that are electrically connected in parallel, each of the first circuit and the second circuit being disposed between the input terminal and the output terminal to allow a current to flow from the input terminal toward the output terminal, wherein:
    the first circuit includes a power storage unit and is configured to form a discharge path, the discharge path allowing a discharge current from the power storage unit to flow toward the output terminal,
    the second circuit is configured to form a blocking path, the blocking path preventing the discharge current from flowing toward the input terminal,
    the first circuit includes a first switch disposed between the input terminal and the output terminal, wherein the first switch forms the discharge path when the first switch is turned on,
    the second circuit includes a second switch disposed between the input terminal and the output terminal, wherein the second switch forms the blocking path when the second switch is turned off, and
    the power storage device is configured to make the first switch be turned on to form the discharge path after the second switch is turned off to form the blocking path in accordance with a stop of supplying power from the power supply to the input terminal.

2. The power storage device according to claim 1, further comprising a delay circuit having a time constant, wherein:
    in accordance with the stop of the supplying power, the delay circuit is configured to output a first signal for turning on the first switch with a delay with respect to an output of a second signal for turning off the second switch by a delay time corresponding to the time constant.

3. The power storage device according to claim 1, further comprising a control circuit that outputs a first signal for turning on the first switch and a second signal for turning off the second switch, wherein:
    in accordance with the stop of the supplying power, the control circuit is configured to output the first signal with a delay with respect to an output of the second signal by a predetermined delay time.

4. The power storage device according to claim 1, further comprising an interlocking circuit that drives the first switch, wherein
    in accordance with the stop of the supplying power, the interlocking circuit is configured to turn on the first switch after detecting that the second switch is turned off.

5. The power storage device according to claim 1, wherein:
    the load includes a limited load, current consumption of the limited load being limited at the stop of the supplying power, and
    a determination condition for determining the stop of the supplying power includes a condition that the current consumption of the limited load is limited.

6. The power storage device according to claim 1, wherein:
    the first circuit includes a first switch disposed between the input terminal and the output terminal, wherein the first switch forms the discharge path when the first switch is turned on, and
    the second circuit includes a diode disposed between the input terminal and the output terminal with an orientation to block a current flowing from the output terminal toward the input terminal, wherein the diode prevents the discharge current from flowing toward the input terminal.

7. The power storage device according to claim 1, wherein:
    the second circuit further includes an interrupter that interrupts the current path in accordance with flowing of an anomalous current in the current path.

8. A vehicle comprising:
    the power storage device according to claim 1; and
    a vehicle body provided with the power storage device.

9. The power storage device according to claim 1, wherein the power storage device is configured to generate a dead time in which both the first switch and the second switch are in an OFF state between the turning off of the second switch and the turning on of the first switch.

* * * * *